United States Patent [19]

Dyfverman

[11] Patent Number: 4,496,990
[45] Date of Patent: Jan. 29, 1985

[54] METHOD AND APPARATUS FOR COPYING CINEMATOGRAPHIC FILM ONTO COLOR VIDEO TAPE

[76] Inventor: Tomas Dyfverman, Vasavägen 8, S-171 39 Solna, Sweden

[21] Appl. No.: 401,545

[22] Filed: Jul. 26, 1982

[30] Foreign Application Priority Data

Aug. 21, 1981 [SE] Sweden .............................. 8104965

[51] Int. Cl.³ .............................................. H04N 9/11
[52] U.S. Cl. ..................................... 358/310; 358/312
[58] Field of Search ................. 358/54, 312, 310, 311; 360/14.1, 14.2, 14.3

[56] References Cited

PUBLICATIONS

Miura et al.; Journal of the Society of Motion Picture and T.V. Engineers, "An Automatic Editing System . . . "; Oct. 1975, pp. 781-783.

Primary Examiner—John C. Martin
Assistant Examiner—Victor R. Kostak
Attorney, Agent, or Firm—Browdy and Neimark

[57] ABSTRACT

When copying cinematographic film onto color video tape there is ensured a given, desired mutual phase position between the picture frames of the film and a periodic signal component in the composite video signal recorded on the video tape, said periodic signal component extending over an integral number of picture frames. This is effected by splicing onto one end of the film (F) a film leader (FS) which is provided with a periodically repeated sequence of at least two mutually sequential picture frames (FS1, FS2) having mutually different, clearly discernible picture contents, for example one being dark and the other being light. The film (F) is fed into the telecine equipment (1) used for the copying process, with the film leader (FS) first. When feeding the film leader (FS) through the telecine equipment (1) the current picture content, of the electronic picture signal from the telecine equipment (1) at any given time is compared by means of an electronic logic comparison circuit (5) with the current phase position of the periodic signal component of the composite video signal, the comparison circuit establishing whether or not the picture content of the picture signal lies in the predetermined, desired phase position relative to the periodic signal component. If such is not the case, feeding of the film through the telecine equipment (1) is stopped and then re-started, this procedure being repeated until the predetermined, desired phase position is obtained and copying of the actual film onto the video tape can take place.

9 Claims, 9 Drawing Figures

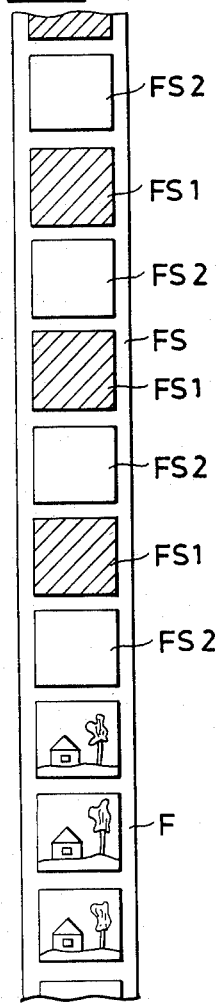
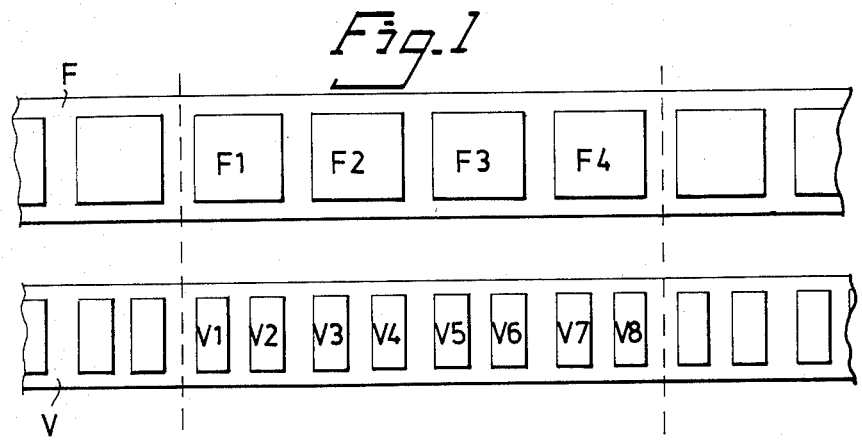

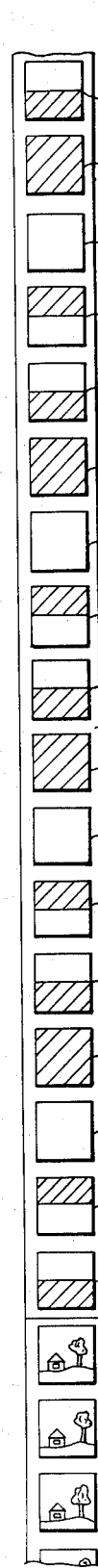
Fig. 5
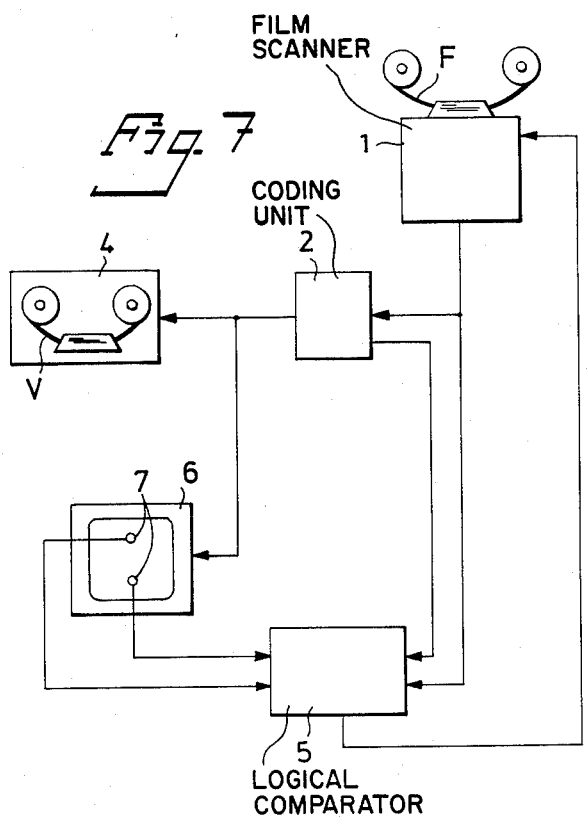
Fig. 6
Fig. 7

METHOD AND APPARATUS FOR COPYING CINEMATOGRAPHIC FILM ONTO COLOR VIDEO TAPE

When copying cinematographic film onto colour video tape, the film is passed through a telecine equipment which sequentially scans the picture frames of the film and generates an electronic picture signal containing picture information relating to the film picture frames. This picture signal, which in reality mostly consists of three signals for the three colours red, green and blue, and which is consequently sometimes referred to as the RGB-signal or colour video signal in component form, is then coded in accordance with the colour video system used, so as to obtain a complete video signal, which is recorded onto a video tape through a video tape recorder. This coding means, i.a., that the complete colour video signal will include one or more periodic signal components having a period extending over a section of the picture signal corresponding to an integral number of picture frames on the film.

In the case of the so-called PAL colour video system, for example, each picture frame on the film is scanned by the telecine equipment twice, and therewith each time with respect to half the picture content of said picture frame, so that the picture signal, and therewith also the coded complete video signal, will include two mutually sequential sections for each film frame, these sections being referred to hereinafter as video fields, which together contain the total picture information of the film frame in question. In the PAL system, coding of the picture signal will also mean that the complete video signal will include a first periodic signal component whose period extends over a length of the video signal corresponding to two film frames, i.e. four mutually sequential video fields. There is also present a second periodic signal component, whose period extends over a length of the video signal corresponding to four film frames, i.e. eight video fields. These two periodic signal components have a fixed mutual phase position. The relationship is thus that illustrated schematically in FIG. 1 of the accompanying drawings, this figure illustrating schematically a video tape V having eight mutually sequential video fields, which are referenced V1-V8 and which are assumed to lie within the period of the periodic signal component of the complete video signal which extends over eight video fields and which thus covers two mutually sequential periods of the periodic signal component in the video signal covering four video fields. For the sake of simplicity, these periodic signal components will also sometimes be referred to as the field sequence of the video signal. FIG. 1 also illustrates schematically a section of a film F with four mutually sequential picture frames F1-F4, which in the illustrated example are assumed to have correspondence in the video fields V1-V8 on the video tape. If the video tape copied from the film is to be used for editing purposes and/or be usable for still-frame viewing by means of a playback device, for example a video tape recorder, which in its still-frame viewing mode shows two mutually sequential video fields, it is essential that when copying the film onto the video tape a specific mutual phase position can be obtained between the film frames, i.e. the picture content of the video signal, and the said field sequence of said video signal. It is of primary importance that either the first two video fields V1 and V2 in the field sequence V1-V8 originate from one and the same picture frame of the film, which automatically means, of course, that the video fields V3-V4 also stem from one and the same picture frame, and likewise the video fields V5, V6 and V7, V8, or alternatively that the video fields V2 and V3 originate from the same film picture frame, it being understood that in this case the video fields V4, V5 and V6, V7 and V8 together with V1 of the next following video field sequence, respectively, also originate from their respective film picture frames. When copying film onto video tape, it must be possible to differentiate between these two possible alternatives and to determine beforehand which one is applicable, since certain video-tape editing apparatus and video tape recorders with still-frame viewing are found which, in order to function correctly, require the application of one of the said alternatives, while other editing apparatus and video tape recorders require application of the other alternative. Hereinafter, the first mentioned alternative is referred to as alternative A, while the other alternative is referred to as alternative B.

As will be evident from Swedish Patent Applications No. 8102411-9 and No. 8104964-5, it is also important in some cases, when copying film onto video tape, to ensure that a given film picture frame will have correspondence in two video fields which occupy a given predetermined position within the periodic fields sequence covering eight video fields V1-V8, or at least within the periodic field sequence covering four mutually sequential video fields. Thus, for example, it may be desired to prescribe that film picture frame F2 in FIG. 1 has correspondence in video fields located at positions V3 and V4 in the field sequence covering eight video fields on the video tape, or at least that said picture frame has correspondence in two video fields located in either position V3, V4 or V7, V8, i.e. located at a certain given position within the field sequence on the video tape covering four video fields.

Some apparatus, although far from all apparatus, used at present to copy film onto video tape are able to differentiate between these two alternatives A and B, and to determine which alternative is applicable in a particular case. It is not possible, however, with any of the known copying apparatus to determine beforehand where specific film picture frames will be located in the field sequences of the colour video signals covering four or eight picture fields respectively. In the case of known copying apparatus, the coding unit used to code the picture signal in component form in accordance with the colour video system used operates continuously at a predetermined speed, while the picture signal containing the picture information of the film frames is not obtained until the film feeding mechanism of the telecine equipment has been started and reached its prescribed speed. The phase position between the picture signal and the coding is consequently quite randomly obtained.

Accordingly, the object of the present invention is to provide a method and corresponding apparatus for copying film onto colour video tape by means of which there can be obtained a predetermined, desired mutual phase position between the picture frames of the film and the periodic field sequency of the video tape.

The characterizing features of the invention are set forth in the following claims.

The invention will now be described in more detail with reference to the accompanying drawings, in which;

FIG. 1 is the previously described schematic illustration of an example of the relationship between the picture frames of the film and the video fields of the video tape;

FIG. 2 illustrates schematically by way of example a first embodiment of a film leader which, when practicing the invention, is spliced on to one end of the film prior to copying the film onto video tape;

FIG. 3A illustrates an example of a truth table for a logic unit incorporated in apparatus according to the invention when using the film leader according to FIG. 2;

FIG. 4A illustrates an example of another truth table for the logic unit incorporated in the apparatus according to the invention when using a film leader according to FIG. 2;

FIGS. 3B and 4B illustrate respectively truth tables corresponding to those illustrated in FIGS. 3A and 4A but intended for copying work carried out in accordance with alternative B;

FIG. 5 illustrates schematically, by way of example, a second embodiment of a film leader which, when carrying out the invention, is spliced to one end of the film to be copied;

FIG. 6 illustrates by way of example a truth table for the logic unit incorporated in the apparatus according to the invention when using a film leader according to FIG. 5; and FIG. 7 illustrates schematically an exemplary embodiment of copying apparatus according to the invention.

As illustrated schematically in FIG. 7, telecine equipment for copying cinematographic colour film onto colour video tape comprises in principle a so-called film scanner 1 which is provided with means for feeding a film F therethrough and in which the picture frames of the film are scanned electronically in sequence and an electronic picture signal, RGB-signal or video signal in component form, containing the picture information of said picture frames is generated in the manner previously described. The picture signal is transmitted from the scanner 1 to a coding unit 2, in which the picture signal from the scanner 1 is coded in accordance with the colour video system used, so as to obtain from the coding unit 2 a complete video signal having the aforementioned periodic field sequencies, this signal being transmitted to a video tape recorder 4, which records the video signal onto a video tape V.

When practicing the method according to the invention there is spliced onto one end of the film to be copied a leader provided with a periodically repeated sequence of mutually sequential picture frames whose picture content clearly differ one from the other.

An embodiment hereof is illustrated schematically in FIG. 2, which shows one end of the actual film F and part of the film leader FS spliced to one end of the film in accordance with the invention. In the illustrated embodiment, the leader FS is provided with a periodically repeated sequence of two picture frames FS1 and FS2 having markedly different picture contents, in that the picture frame FS1 of the illustrated embodiment is dark, for example black, while the picture frame FS2 is light, for example white.

In accordance with the invention, the film F on which the leader FS has been spliced is loaded into the scanner 1 in such a way that the leader FS is scanned first. During the scanning of the leader it is continuously determined whether the electronic picture signal from the scanner 1 originates from a dark picture frame FS1 or a light picture frame FS2 on the leader FS, and a signal representating the current picture content of the picture signal is generated and sent to a logic comparison circuit 5. As illustrated in FIG. 7, this can either be effected by sending the picture signal from the scanner 1 to the comparison circuit 5 and electronically analysing the signal therein, or by transmitting the complete video signal from the coder 2 to a TV-monitor 6 having mounted on the screen thereof photo detectors 7 arranged to sense the nature of the current image and to send corresponding signals to the logic comparison circuit 5. This circuit 5 is also arranged to receive information from the coder 2 concerning the position of the current video field in the periodic sequence of video fields V1–V8.

The logic comparison circuit 5 is of conventional design and is arranged to compare the phase position between the field sequence V1–V8 and the picture frame sequence FS1, FS2 by determining whether certain, given video fields in the sequence V1–V8 occur simultaneously with certain, given picture frames in the picture frame sequence FS1, FS2 in accordance with a predetermined logic truth table. A truth table which can be used in the present context is illustrated in FIG. 3A. It should be noted that in the case of a film leader containing a periodically repeated picture frame sequence which only includes two mutually sequential picture frames, as shown in FIG. 2 for example, attention can only be paid to the periodic field sequence of the video signal extending over four mutually sequential video fields, i.e. over two mutually sequential picture frames, and hence the video fields V1 and V5 in FIG. 1 are to be considered as being similarly located in the field sequence, which thus also applies to the video fields V2, V6 and similarly video fields V3, V7 and video fields V4, V8. According to the truth table illustrated by way of example in FIG. 3A the only phase position which the logic comparison circuit 5 will accept as being correct is when the picture frame ES1 on the leader FS appear simultaneously with video fields V1/V5 and V2/V6, while the picture frames FS2 appear simultaneously with video fields V3/V7 and V4/V8. This is one of the four different possible mutual phase positions between the video field sequence and the picture frame sequence, and the only one which ensures that a picture frame FS1 always has correspondence in the video fields V1/V5 and V2/V6 in the field sequence, while a picture frame FS2 always has correspondence in the video fields V3/V7 and V4/V8 in the field sequence. When the film leader FS and the actual film F are spliced in the manner illustrated schematically in FIG. 2, this will mean that an equivalent of the first picture frame of the actual film F will be found in the video fields V1/V5 and V2/V6 in the field sequence. Should any other relationship occur between the video fields and the picture frames, the logic comparison circuit 5 will indicate that the phase position between the video fields sequence and the picture frames of the film is wrong. When this occurs, feeding of the film through the scanner 1 is stopped, either manually or by an operator or, as indicated schematically in FIG. 7, automatically by means of a signal from the comparison circuit 5. Feeding of the film is then re-started and the logic comparison circuit 5 again compares the mutual phase position between the video field sequence and the picture frames and decides whether the phase position is this time the desired phase position.

Since there are only four possible phase positions and since one of these possible phase positions is the desired phase position, it is highly probable that stopping and re-starting need only take place a few times before obtaining the correct desired phase position and before copying of the actual film F can take place. Alternatively, it is possible with the use of control circuits for film feeding mechanism in the scanner 1 to automatically guide the film to the correct position under the influence of a control signal from the logic comparison circuit 5.

If, when applying the embodiment illustrated in FIG. 2, it is instead desired that the first picture frame on the actual film F has correspondence in the video fields V3/V7 and V4/V8 in the video field sequence, the logic comparison circuit 5 is designed to use the truth table shown in FIG. 4 instead.

If the location of a given picture frame of the film in the video field sequence is unimportant, and if it is only desired to ensure that the first two video fields V1/V5 and V2/V6 in the video field sequence originate from one and the same picture frame, the logic comparison circuit 5 is designed to accept both the truth table illustrated in FIG. 3 and the truth table illustrated in FIG. 4. Thus, in this case, two of the total of four different possible phase positions between the video field sequence and the picture frames of the film are acceptable for copying of the film. This particular case is of interest when copying film onto black and white video tape, since the black and white video signal has none of the field sequences extending over four or eight video fields respectively, but on the other hand still has a field sequence which extends over two video fields, since also in this case each film picture frame has correspondence in two mutually sequential video fields.

It will be understood that the truth tables 3A and 4A enable copying to be carried out in accordance with the aforedescribed alternaive A. Corresponding truth tables which enable film to be copied onto video tape in accordance with alternative B will have the form illustrated in FIGS. 3B and 4B respectively.

If, when copying, it is desired to also take into account the periodic field sequence of the complete video signal covering eight video fields and to ensure that a certain, given film frame in the film, for example the first film frame, takes a given, predetermined position in the field sequence V1-V8 comprising eight mutually sequential video fields, it is possible to use, for example, a film leader of the form illustrated schematically in FIG. 6. This leader is provided with a periodically repeated sequence of four mutually sequential picture frames FS1-FS4 having mutually different, readily discernible picture contents. In this case, the logic comparison circuit 5 may be designed to work, for example, with a truth table according to FIG. 6, it being ensured in this way that a picture frame FS1 on the leader FS, and therewith also the first picture frame on the actual film F, will have correspondence in the video fields V1 and V2 of the field sequence V1-V8. As will be readily understood, this also results in a copying according to alternative A.

It will also be understood that the logic comparison circuit 5 can be designed in a manner which enables it to be switched between various types of truth tables, so as to make it possible to select freely the desired position for a given picture frame of the film, for example the first picture frame, in the field sequence of the video signal.

Although the invention has been described in the aforegoing with reference to the PAL system, it will be understood that the invention can also be applied with other colour video systems where the video signal includes a periodic signal component having a period which extends over a plurality of mutually sequential picture frames.

I claim:

1. A method for copying a cinematographic film onto colour video tape, comprising the steps of feeding the film through a telecine equipment in which the picture frames of the film are scanned electronically in sequence and an electronic picture signal containing the picture information of the film picture frames is generated and said picture signal is coded in accordance with the colour video system used so as to provide a composite video signal which includes at least one periodic signal component having a period extending over en integral number of film picture frames; and recording said composite video signal onto a video tape, in which method before feeding the film into the telecine equipment, a film leader is spliced onto one end of the film, said film leader being provided with a periodically repeated sequence of at least two sequential picture frames, each having a picture content which is clearly different from the other, it being ensured when splicing said leader to said film that said picture frame sequence has a predetermined position relative to the picture frames on the actual film;

the film is fed into the telecine equipment with said film leader entering first; and while the leader is being fed through the telecine equipment, the current picture content of said picture signal is compared with said periodic signal component in order to establish whether or not the picture content of the picture signal has a given desired phase position relative to said periodic signal component, before the copying of the actual film onto the video tape is commenced.

2. A method as claimed in claim 1, in which said picture frame sequence on said film leader consists of four sequential picture frames.

3. A method as claimed in claim 1, in which the various picture frames in said picture frame sequence on said film leader are provided with different readily discernible combinations of dark, for example black, portions and light, for example white, portions.

4. A method as claimed in claim 1, in which the current picture content of said picture signal at any given time is detected by electronically analysing said electronic picture signal.

5. A method as claimed in claim 1, in which the current picture content of said picture signal at any given time is detected by transmitting the composite video signal to a TV-monitor and detecting the image produced on the screen of said monitor by means of photodetectors.

6. An apparatus for copying cinematographic film onto colour video tape, comprising
a telecine equipment for electronically scanning the picture frames of the film in sequence, generating an electronic picture signal containing the picture information of the film picture frames;
means for coding said picture signal in accordance with the colour video system used so as to provide a composite video signal which includes at least one periodic signal component characteristic of the colour video system used;

tape recording means for recording said composite video signal on a video tape;

means for detecting, when feeding through the telecine equipment a film leader containing a periodically repeated sequence of at least two sequential picture frames having picture contents which clearly differ one from the other, the current picture content of the picture signal at any tiven time and generating a signal representative of the various picture frames in said picture frame sequence; and means for comparing said signal with said periodic signal component of the composite video signal and for indicating whether or not said picture frame sequence has a given, desired phase position relative to said periodic signal component.

7. An apparatus as claimed in claim 6, wherein said means for generating the signal representing the picture frames in said picture frame sequence includes means for electronically analysing said electronic picture signal.

8. An apparatus as claimed in claim 6, wherein said means for generating the signal representing the picture frames in said picture frame sequence includes a TV-monitor to which said composite video signal is supplied, and photo-detector means for detecting the image produced on the screen of said TV-monitor.

9. An apparatus as claimed in claim 6, comprising means influenced by said comparison means and arranged to stop and re-start feeding of film through the telecine equipment until such time said given, desired phase position is obtained.

* * * * *